United States Patent
Leber et al.

(10) Patent No.: US 9,976,917 B2
(45) Date of Patent: May 22, 2018

(54) METHOD FOR VERIFYING A TEMPERATURE MEASUREMENT IN A MICRO-ENVIRONMENT AND SYSTEM FOR VERIFYING A TEMPERATURE MEASUREMENT IN A MICRO-ENVIRONMENT

(71) Applicant: QIAGEN INSTRUMENTS AG, Hombrechtikon (CH)

(72) Inventors: Dirk Leber, Gruet (CH); Stephan Baehler, Zurich (CH); Hansueli Meyer, Uster (CH)

(73) Assignee: QIAGEN INSTRUMENTS AG, Hombrechtikon (CH)

(*) Notice: Subject to any disclaimer, the term of this patent is extended or adjusted under 35 U.S.C. 154(b) by 812 days.

(21) Appl. No.: 14/352,708

(22) PCT Filed: Oct. 22, 2012

(86) PCT No.: PCT/EP2012/070856
§ 371 (c)(1),
(2) Date: Apr. 18, 2014

(87) PCT Pub. No.: WO2013/057308
PCT Pub. Date: Apr. 25, 2013

(65) Prior Publication Data
US 2014/0254622 A1    Sep. 11, 2014

(30) Foreign Application Priority Data

Oct. 20, 2011  (EP) .................................. 11186023

(51) Int. Cl.
*G01K 11/00* (2006.01)
*G01K 15/00* (2006.01)
*G01K 11/20* (2006.01)
*G01K 11/16* (2006.01)

(52) U.S. Cl.
CPC .......... *G01K 15/007* (2013.01); *G01K 11/165* (2013.01); *G01K 11/20* (2013.01); *G01K 15/005* (2013.01)

(58) Field of Classification Search
USPC .................................................. 374/120, 161
See application file for complete search history.

(56) References Cited

U.S. PATENT DOCUMENTS 4,455,741 A  *  6/1984  Kolodner ............... G01K 11/20
                                                       250/458.1
4,683,195 A      7/1987  Mullis et al.
(Continued)

FOREIGN PATENT DOCUMENTS

WO      9849340     11/1998
WO      03102522    12/2003

*Primary Examiner* — Mirellys Jagan
(74) *Attorney, Agent, or Firm* — McBee Moore Woodward & Vanik IP, LLC; Susan McBee (57) ABSTRACT

The present invention pertains to a method suitable for analyzing the temperature control of a device which is supposed to establish a defined temperature in a micro-environment, said method comprising a first Optical Temperature Verification step which comprises
a) providing one or more thermochromatic liquid crystals in a micro-environment, wherein each thermochromatic liquid crystal has a specific event temperature,
b) providing one or more temperature dependent luminophores in a micro-environment,
c) varying the temperature in the micro-environments and irradiating the micro-environments with light,
d) recording the luminescence of the one or more temperature dependent luminophores when the event temperature of the one or more thermochromatic liquid crystals is reached in the micro-environment
and wherein said method preferably comprises a second Optical Temperature Verification step, which comprises the following
(Continued)

a) providing one or more temperature dependent luminophores that were used in the First Optical Temperature Verification in a micro-environment,
b) varying the temperature of the micro-environments and irradiating the micro-environments with light,
c) monitoring the luminescence emitted.

The respective method is very suitable to analyze the temperature control of a thermal cycler, in particular during a calibration.

20 Claims, 4 Drawing Sheets

(56) References Cited

U.S. PATENT DOCUMENTS

| | | | |
|---|---|---|---|
| 4,683,202 A | 7/1987 | Mullis | |
| 4,708,494 A * | 11/1987 | Kleinerman | G01J 1/58 250/361 R |
| 4,800,159 A | 1/1989 | Mullis et al. | |
| 4,889,818 A | 12/1989 | Gelfand et al. | |
| 4,965,188 A | 10/1990 | Mullis et al. | |
| 4,988,617 A | 1/1991 | Landegren et al. | |
| 5,023,171 A | 6/1991 | Ho et al. | |
| 5,066,584 A | 11/1991 | Gyllensten et al. | |
| 5,075,216 A | 12/1991 | Innis et al. | |
| 5,079,352 A | 1/1992 | Gelfand et al. | |
| 5,091,310 A | 2/1992 | Innis | |
| 5,104,792 A | 4/1992 | Silver et al. | |
| 5,653,359 A * | 8/1997 | Sondermann | A21B 3/137 220/323 |
| 2001/0001642 A1 * | 5/2001 | Klimant | G01K 11/3213 422/82.07 |
| 2006/0077311 A1 * | 4/2006 | Renneberg | G01K 11/165 349/5 |
| 2012/0212520 A1 * | 8/2012 | Matsui | G09G 3/3611 345/690 |

* cited by examiner

| Number of micro-environment | Content |
|---|---|
| 1 | TLC1 |
| 2 | TLC1 |
| 3 | TLC1 |
| 4 | TLC1 |
| 5 | TLC2 |
| 6 | TLC2 |
| 7 | TLC2 |
| 8 | TLC2 |
| 9 | TLC3 |
| 10 | TLC3 |
| 11 | TLC3 |
| 12 | TLC3 |
| 13 | FD1 |
| 14 | FD2 |
| 15 | FD1 |
| 16 | FD2 |
| 17 | FD1 |
| ... | ... |
| 70 | FD2 |
| 71 | FD1 |
| 72 | FD2 |

Fig. 6

METHOD FOR VERIFYING A TEMPERATURE MEASUREMENT IN A MICRO-ENVIRONMENT AND SYSTEM FOR VERIFYING A TEMPERATURE MEASUREMENT IN A MICRO-ENVIRONMENT

CROSS REFERENCE TO RELATED APPLICATIONS

This application is a § 371 National Stage Application of PCT/EP2012/070856, filed Oct. 22, 2012 which claims priority to EP 11186023.5, filed Oct. 20, 2011.

FIELD OF THE INVENTION

The invention pertains to the field of chemical, biological and biotechnology processes for which a specific temperature is required. Especially the invention relates to a method for verifying or calibrating a measurement of a temperature in a micro-environment and a system for verifying or calibrating a temperature measurement in a micro-environment.

BACKGROUND OF THE INVENTION

Many processes require a specific temperature in such a way that the efficacy of the process or a particular step in the process is dependent on the execution of the process/step at a specific temperature. Monitoring of the temperature of the environment of the process/step is necessary for that the environment can either be heated or cooled to maintain the temperature at the desired temperature as necessary. Continued monitoring of the environment temperature is required so that the temperature can be maintained at the desired level by heating or cooling, as necessary. The same considerations apply when different temperatures are required for further steps in a process.

One example for a process which requires specific temperatures is the polymerase chain reaction (PCR) which involves multiple cycles. The PCR is a scientific technique in molecular biology, which amplifies polynucleotide sequences each time a cycle is completed. The technique of PCR is well known and is described in many books, including, PCR: A Practical Approach M. J. McPherson, et al., IRL Press (1991), PCR Protocols: A Guide to Methods and Applications by Innis, et al., Academic Press (1990), and PCR Technology: Principals and Applications for DNA Amplification H. A. Erlich, Stockton Press (1989). PCR is also described in many U.S. patents, including U.S. Pat. Nos. 4,683,195; 4,683,202; 4,800,159; 4,965,188; 4,889,818; 5,075,216; 5,079,352; 5,104,792; 5,023,171; 5,091,310; and 5,066,584.

Each PCR cycle usually comprises three basic discrete temperature steps, a denaturation step, an annealing step and an extension step. Denaturation of DNA typically takes place at around 90 to 95° C., annealing a primer to the denatured DNA is typically performed at around 40 to 60° C., and the step of extending the annealed primers with a polymerase is typically performed at around 70 to 75° C. Therefore, during a PCR cycle the temperature of the reaction mixture must be varied, and varied many times during a multicycle PCR experiment. The efficacy of each step is strongly dependent on the temperature at which each step is carried out. The PCR technique has a wide variety of biological applications, including for example, DNA sequence analysis, probe generation, cloning of nucleic acid sequences, site-directed mutagenesis, detection of genetic mutations, diagnoses of viral infections, molecular "fingerprinting" and the monitoring of contaminating microorganisms in biological fluids and other sources. The PCR is usually carried out in a laboratory apparatus called thermal cycler or PCR cycler.

In addition to PCR, other in vitro amplification procedures, including ligase chain reaction as disclosed in U.S. Pat. No. 4,988,617 to Landegren and Hood, are known and advantageously used in the prior art. More generally, several important methods known in the biotechnology arts, such as nucleic acid hybridization and sequencing, are dependent upon changing the temperature of solutions containing sample molecules in a controlled fashion. Conventional techniques rely on use of individual wells or tubes cycled through different temperature zones. For example, a number of thermal "cyclers" used for DNA amplification and sequencing are disclosed in the prior art in which a temperature controlled element or "block" holds a reaction mixture, and wherein the temperature of the block is varied over time. One advantage of these devices is that a relatively large number of samples can be processed simultaneously, e.g. 96 well plates are commonly employed.

Different designs of such thermal cyclers are known. E.g. devices are available for the thermal cycling of multiple samples, typically for the amplification of DNA. A common format of such devices is the inclusion of a block of heat conductive material which has a plurality of channels or cavities therein for receiving vessels—such as reaction tubes or plates—in which the desired reactions are executed. Monitoring of temperature is relatively easy in such devices since a temperature probe can be associated with the block.

However, such block devices suffer various drawbacks, e.g. in that they are relatively slow in cycling the reaction mixtures, they are relatively energy intensive to operate and detection of the reaction mixture in situ is difficult. In an effort to avoid several of these disadvantages, other thermal cyclers have been developed in which a plurality of containers for holding reaction mixture(s) are supported on a rotatable carousel rotatably mounted within a chamber adapted to be heated and cooled.

Devices for thermal cycling of reaction mixtures are also known in which the reaction vessels are held in a rotor which is rotated in a controlled temperature environment such as an insulated chamber containing the rotor (also known as "Rotor-Gene"). Temperature cycling is effected by heating and cooling of the environment. The carousel or rotor has apertures, receptacles or slots for the containers, vials or tubes. Rotors are known, which have 60 or 72 receptacles for a corresponding number of vials or tubes. Such a device is disclosed, for example, in International Patent Application No. PCT/AU98/00277 (Publication No. WO 98/49340). Since reaction mixtures are rotated in the PCT/AU99/00277 device, it is difficult to accurately measure the temperature of a reaction mixture. Regardless of how well the temperature of the rotor environment is controlled, there can be a temperature difference between a reaction mixture and the environment per se. Since accurate temperature control is essential for most thermal cycling reactions, knowledge of the actual temperature of the reaction mixtures, i.e. the liquid in the reaction tube is important. Compensation can then be made in the environmental temperature management program to give a desired temperature in the actual reaction tube. However, the dynamic thermal behaviour of a volume of an aqueous solution within a rotating system is not easy to monitor. Sensors with cables will introduce an additional thermal capacity. Further, the cables will form an additional thermal bridge, which may also influence the measurement of the temperature. Thus, while it is generally easy to monitor the temperature of the overall environment of a process, it is not always easy to monitor the temperature of process micro-environments.

An important aspect of the operation of respective thermal cyclers thus is the accurate control of the temperature of the contents of reaction vessels. This is equivalent to how accurately the temperature of the air surrounding the reaction vessels is controlled. However, the temperature within a vessel may not necessarily be the same as the chamber temperature as sensed by the Rotor-Gene's temperature control equipment, so compensation has to be made in that equipment.

Known from WO 03/102522 A1 is a system and a method for the optical calibration of the temperature of a reaction in a vessel. A relationship between the detectable chamber temperature and the temperature in the reaction vessel is obtained in the calibration procedure. During calibration a transparent vial having a luminophore-containing component layered over or under a thermochromic liquid crystal (TLC) component is used. The system comprising the luminophore-containing component and the TLC component is irradiated by a light source and any luminescence emitted by the luminophore-containing component is detected by a detector while recording the temperature of said environment. The obtained data is used to provide a temperature calibration curve with regard to chamber temperature versus reaction vial temperature. Thereby, it can be controlled/verified, that the temperature control of a respective device works accurately. For this purpose, the combination of luminophore and TLC is provided in a micro-environment (reaction vial) and e.g. a PCR profile is run in the course of which different discrete temperatures must be established in the micro-environment. The transition in the luminescence of the TLC/luminophore combination is recorded. Based on the assumed transition temperature of said combination, the actual temperature that occurred in the micro-environment is deducted/determined and compared to the temperature that was supposed to be achieved if the temperature control worked properly. If deviations are found, appropriate adjustment in the temperature control of the device are performed until the actual temperature in the micro-environment that is determined by the TLC/luminophore combination matches sufficiently well the expected temperature.

The accuracy of the above mentioned methods and systems leave room for improvement. Further, when using optical measurement for determining the temperature an optical drift might occur which influences the measurement. For example in case that the luminous flux of the illuminating source varies with time, the detected intensity of the optical detector varies. Further, the irradiating source, namely the luminous flux, might be influenced by the temperature of the irradiating source, and this optical drift will directly result in a biased temperature measurement. This poses a problem in particular with thermal cyclers which have no reference channel for compensating drifts in the optical system.

The present invention seeks to overcome or ameliorate at least one of the disadvantages of the above mentioned prior art or to provide a useful alternative.

SUMMARY OF THE INVENTION

The present invention pertains to methods that allow to analyse the performance and in particular the accuracy of the temperature control of a device, such as in particular a thermal cycler. As described above, such devices must achieve and maintain specific temperatures in the comprised micro-environments such as e.g. reaction vials in order to ensure the accuracy of a temperature-dependent reaction that is performed in said micro-environment e.g. a PCR reaction. Therefore, it is important to ensure and hence verify that the temperature control of the device works properly and hence that the actual temperature that is achieved in the micro-environment corresponds to the temperature that is supposed to be achieved therein. If deviations are found, proper adjustments of the temperature control can be made until the actual temperature corresponds to the intended temperature. For determining the actual temperature in a micro-environment e.g. during a PCR cycle for verifying the accuracy of the temperature control of the device, a temperature dependent luminophore, preferably a fluorescent dye, can be used which is comprised in the micro-environment. Preferably, it is comprised in a liquid volume. The emitted luminescence can be correlated with the actual temperature that is attained in the micro-environment. By comparing the respectively determined actual temperature with the desired temperature that is supposed to be achieved according to the temperature control it is possible to analyse the accuracy of the temperature control and, if necessary, to make proper adjustments to the temperature control.

The present invention is now based on the finding that the accuracy of a temperature dependent luminophore based determination of the temperature in a micro-environment, and in particular in a liquid volume, can be improved, if the luminescence intensity of the temperature dependent luminophore has been measured at and hence has been mapped to a specific, absolute temperature that occurs in said micro-environment. Furthermore, it is advantageous to determine the luminescence intensity under conditions within the micro-environment that prevail when the device is in use, e.g. to perform a reaction such as a PCR reaction in said micro-environment.

Thus, according to a first aspect, a method is provided that is suitable for analysing the temperature control of a device suitable to establish a defined temperature in a micro-environment, said method comprising a first Optical Temperature Verification step which comprises the following
  a) providing one or more thermochromatic liquid crystals in a micro-environment, wherein each thermochromatic liquid crystal has a specific event temperature,
  b) providing one or more temperature dependent luminophores in a micro-environment,
  c) varying the temperature of the micro-environments and irradiating the micro-environments with light,
  d) recording the luminescence of the one or more temperature dependent luminophores when the event temperature of the one or more thermochromatic liquid crystals is reached in the micro-environment comprising said thermochromatic liquid crystal.

According to a second aspect, a system for verifying or calibrating the temperature control of a thermal air cycler is provided, said system comprising a rotor comprising receptacles for micro-environments, wherein said rotor comprises in micro-environments
  a) two or more different thermochromatic liquid crystals, each thermochromatic liquid crystal having a different event temperature, and
  b) one or more temperature-dependent luminophores.

According to a third aspect, the present invention pertains to the use of a temperature dependent luminophore when analysing the temperature control of a device which is supposed to establish a defined temperature in a micro-environment, wherein at least two different temperature dependent luminophores differing in their temperature dependence are used for compensating the optical drift of the optical system and determining the quotient of the fluorescence intensities of the first temperature dependent luminophore and the second temperature dependent luminophore at the same temperature. The second temperature dependent luminophore is less temperature dependent than the first one.

Other objects, features, advantages and aspects of the present application will become apparent to those skilled in the art from the following description and appended claims. It should be understood, however, that the following description, appended claims, and specific examples, while indicating preferred embodiments of the application, are given by way of illustration only. Various changes and modifications within the spirit and scope of the disclosed invention will become readily apparent to those skilled in the art reading the following.

DETAILED DESCRIPTION OF A PREFERRED EMBODIMENT

According to a first aspect, a method is provided suitable for analysing the temperature control of a device suitable to establish a defined temperature in a micro-environment comprised in an environment, said method comprising a first Optical Temperature Verification step which comprises the following a) providing one or more thermochromatic liquid crystals in a micro-environment, wherein each thermochromatic liquid crystal has a specific event temperature, wherein preferably, each TLC having a specific event temperature is comprised in a separate micro-environment;

b) providing one or more temperature dependent luminophores in a micro-environment, wherein, preferably, different luminophores are provided in separate micro-environments;

c) varying the temperature of the micro-environments and irradiating the micro-environments with light, d) recording the luminescence of the one or more temperature dependent luminophores when the event temperature of the one or more thermochromatic liquid crystals is reached in the micro-environment comprising the respective thermodynamic liquid crystal.

The term "environment" as used herein, preferably refers to any temperature-controlled environment established in a device, e.g. in a chamber of an apparatus. E.g. the temperature in said environment can be controlled for a process or a step within a process to be carried out at a specific temperature. The term preferably refers to a heatable reaction chamber, especially of a thermal cycler, in particular a thermal cycler in which the reaction vessels are comprised in a rotor which is rotated in a controlled temperature environment. Temperature cycling is achieved in a respective thermal cycler by heating and cooling the environment, here the insulated chamber. According to one embodiment, it refers to a heated block having at least one cavity for holding a reaction vessel. The term furthermore includes an environment wherein the temperature is controlled by heating or cooling the environment as necessary.

The term "micro-environment" as used herein preferably refers to an environment that is comprised within the temperature-controlled environment or a portion of the temperature-controlled environment. The term thus in particular refers to a reaction vessel and more preferred to the interior of a reaction vessel that is comprised within the temperature-controlled environment, said temperature-controlled environment being e.g. a heatable reaction chamber or heating block of a thermal cycler. In particular, the term micro-environment encompasses and refers to a liquid that is comprised within a reaction vessel comprised in a respective temperature controlled environment. Preferably, the temperature of the micro-environment is controlled via the temperature of the environment comprising the micro-environment. With the present invention a calibration procedure is proposed, wherein the temperature of a micro-environment positioned in the environment, wherein the micro-environment preferably is provided by a liquid in a reaction vessel, is optically determined.

The term "thermochromatic liquid crystal" (TLC) as used herein in particular refers to a "clearing point" type TLC or a "temperature-sensitive" type TLC. With the "clearing point" type TLC, at a certain temperature called the transition temperature, or clearing point, the composition changes from opaque to clear. Thus, at the transition temperature, the optical characteristics suddenly change. Such TLCs are commercially available over a broad range of transition temperatures. With the "temperature-sensitive" type TLC, below a certain temperature, called the "Red Start" temperature, the TLC is mostly clear. Above a second, higher temperature which is the clearing point temperature, the TLC is also mostly clear. Between these two temperatures, the TLC selectively reflects visible light. At the Red Start temperature, the TLC changes to a state in which it strongly reflects red light. At the Blue Start temperature, the TLC changes to a state in which it strongly reflects Blue light. As the temperature of the environment in which the RLC is held increases, the colour of light that the TLC reflects most strongly decreases in wavelength, from red to orange, yellow, green, blue, and then violet. By monitoring the output of the optical system, i.e. the light detector, when irradiating the micro-environment associated with the TLC, it can be determined when the micro-environment and its content are at, above, or below a temperature at which the optical properties suddenly change. It is referred herein to said temperature, at which the optical characteristics suddenly change, also as the "event temperature" of the TLC. In the case of a clearing point TLC, an example of the "event temperature" is the TLC's transition temperature. In the case of a temperature-sensitive TLC, an example of such an event temperature is the temperature at which the TLC most strongly reflects or redirects a particular wavelength of light from the vessel's light source.

The term "luminophore" as used herein, in particular refers to a compound that manifests luminescence. Usually, it is a certain component of the compound such as an atom or an atomic grouping that is responsible for the luminescence. The luminophore is able to absorb energy of a specific wavelength and re-emit energy at a different specific wavelength. The intensity of the re-emitted energy can be detected by a light detector. The luminophore can be present in many different forms including in liquid, gaseous and solid forms. Preferably, the luminophore can be present as an, respectively in an aqueous or organic solution. In solid form, the luminophore can be provided as an internal or external coating or painting of the micro-environment. The term luminophore includes fluorophores as well as phosphors. Preferably, said term refers to a fluorophore. Fluorophores have the advantage that they have a rather short decay lifetime. Preferably, said term refers to a fluorescent dye and hence any dye containing a fluorophore. In a temperature-dependent luminophore, the optical characteristics depend on the temperature of the luminophore. Thus, by analysing the luminescence of a temperature-dependent luminophore present in a certain micro-environment, it is possible to deduct the temperature of said micro-environment. Preferably, said temperature-dependent luminophore, which preferably is a fluorescent dye, is provided in a setting that matches the setting that is subsequently used in the reaction that can be performed in said device. E.g. in a thermal cycler, the micro-environments usually are provided by reaction vessels such as tubes, vials or wells, which comprise a discrete amount of liquid, in particular of an aqueous solution. This set-up provides the micro-environment which is supposed to have a discrete temperature in order to allow the reaction to be accurately performed. Therefore, it is preferred to provide the luminophore, which preferably is a fluorescent dye, also in a liquid, preferably in an aqueous solution, in the same type of reaction vessel and preferably in the same standard volume that is usually used for said reaction in order to closely mirror the conditions that will be present in the micro-environment when the device is in use. This can significantly improve the calibration process.

The present invention is based on the finding that the accuracy of a temperature dependent luminophore based optical determination of the temperature in a micro-environment can be improved, if the luminescence intensity of the temperature dependent luminophore is measured at and hence is mapped to a specific, absolute temperature that occurs in said micro-environment. To achieve a respective mapping, a first Optical Temperature Verification step is performed in the method according to the present invention. Herein, an absolute temperature measurement is performed by using at least one thermochromatic liquid crystal (TLC) which has a specific event temperature. Said TLC is comprised in a respective micro-environment and hence, will react (only) to temperature changes that occur within the micro-environment. The temperature of the micro-environment is then varied in step c), preferably by varying the temperature in the environment in which the micro-environments are situated.

The temperature of the environment is preferably recorded simultaneously in step c). If the event temperature is reached in the micro-environment, the TLC will change its optical characteristics, thereby providing a signal that a temperature is reached in the micro-environment that corresponds to the event temperature of the used TLC. The observed change in the optical characteristics of the thermochromatic liquid crystal at the event temperature allows an absolute temperature determination in the micro-environment. Preferably simultaneously, or almost simultaneously, the fluorescence of the temperature dependent luminophore is determined. Thus, it is also possible to determine the luminescence of the temperature dependent luminophore after the change in the optical characteristics of the TLC has occurred. However, here, it must be ensured that it is determined promptly in order to ensure that the temperature within the micro-environment comprising the luminophore is still at the same temperature as the micro-environment at the time the optical characteristics of the TLC occurred. Thereby, it is possible to determine and record the specific luminescence intensity of the used temperature dependent luminophore that occurs when a specific absolute temperature is reached in the micro-environment, namely the event temperature of the TLC. Thus, in the method of the present invention, the specific luminescence intensity of the temperature dependent luminophore in the micro-environment is correlated to a specific absolute temperature within the micro-environment, wherein said absolute temperature in the micro-environment is being indicated by the change in the optical characteristics of the TLC. Preferably, the luminescence of the temperature dependent luminophore is determined at least at two, preferably at least at three, discrete absolute temperatures, herein also referred to as calibration temperatures. Said absolute temperatures can be determined during operation of the device by using different TLCs which have their event temperature approx. at the calibration temperatures, which are preferably temperatures which are used as or come close to the reaction temperatures that shall be established in the micro-environments when the device is in use. Preferably, the fluorescence intensity of the temperature-dependent luminophore measured at the event temperature is stored together with the event temperature. Having the actual absolute temperature at two or more discrete points and having the corresponding luminescence of the temperature dependent luminophore, a mapping of the relative luminescence of the temperature dependent luminophore to the absolute temperatures may be achieved. Thus, according to one embodiment, the method comprises a step of mapping the relative luminescence of the one or more temperature dependent luminophores determined at the event temperature of the one or more thermochromatic liquid crystals to the corresponding absolute temperature. Therefore, it is possible to determine the fluorescence intensity of the temperature-dependent luminophore as a function of the temperature in advance and said data can be stored e.g. in a table or a model.

In a preferred embodiment which is also shown in the examples, the temperature dependent luminophore(s) and the thermochromatic liquid crystal(s) are provided in separate micro-environments, e.g. in separate reaction vessels. By providing the temperature-dependent luminophore(s) and the thermochromatic liquid crystal(s) in different micro-environments it becomes possible that the luminescence of the temperature-dependent luminophore is measured without interfering with the thermochromatic liquid crystal which is used to determine the absolute temperature in the micro-environment. The temperature dependent can be positioned within a reaction vessel which is placed in a receptacle of thermo cycler and the thermochromatic liquid crystal can be positioned within a different reaction vessel which is placed in a further, different receptacle of the device. If more than one temperature dependent luminophore is used, each temperature dependent luminophore is placed within a different reaction vessel. Furthermore, if more than one thermochromatic liquid crystal is used, it is also preferred to provide each thermochromatic liquid crystal in a different reaction vessel. Each reaction vessel is then placed in a separate receptacle of the thermo cycler. Suitable arrangements are shown in the examples.

The at least one temperature dependent luminophore that has been used in the first Optical Temperature Verification step can then be subsequently used to verify the temperature control of the device, e.g. a thermal cycler, by varying the temperature in the micro-environment and analysing whether the actual temperature that is achieved in the micro-environment(s) matches the desired temperature that is supposed to be achieved therein according to the temperature control of the device. This verification is done using the emitted luminescence of the temperature dependent luminophore. The data that has been obtained in the first Optical Temperature Verification step allows to determine the temperature that is achieved in the micro-environment comprising the temperature dependent luminophore more accurately. Therefore, more accurate adjustments of the temperature control are possible when using the method according to the present invention. This will have a positive effect on the efficacy of a process which has to be carried out in the micro-environment because of the improved accuracy of the temperature determination. This accuracy is achieved even if the micro-environment rotates in the environment.

Furthermore, the data obtained in the first Optical Temperature Verification step can be used e.g. to compare the determined environment temperature, which e.g. is determined by a temperature sensor comprised in the environment, with the desired micro-environment temperature that is supposed to be achieved and the actual micro-environment temperature as is indicated by the TLC. Already the information obtained in the first Optical Temperature Verification step is useful for making a temperature control analysis and hence for verifying or calibrating a temperature measurement in a micro-environment. In particular, the accuracy of the temperature sensor and the accuracy of the temperature that is established in the micro-environment can be analysed and e.g. verified or calibrated. Thus, said method is in particular useful for verifying or calibrating a temperature measurement in a thermal cycler. E.g. if differences are found in the actual temperature and the temperature that was supposed to be achieved in the micro-environment, appropriate adjustments can be performed.

According to a preferred embodiment, the method according to the present invention comprises a second Optical Temperature Verification step, which comprises the following
 a) providing one or more temperature dependent luminophores that were used in the first Optical Temperature Verification step in a micro-environment,
 b) varying the temperature of the micro-environments and irradiating the micro-environments with light,
 c) monitoring the luminescence emitted.

In said second Optical Temperature Verification step e.g. the temperature profile of a PCR cycle can be tested. The temperature of the micro-environment(s) can be varied by varying the temperature of the environment in which the micro-environments are situated. Testing the temperature control of the device in such a dynamic setting, wherein the temperature is varied as it will be done when the device is in its regular use, is important in order to test the accuracy of the temperature control and hence the accuracy of the temperature that is achieved in the microenvironments in a "real-life" setting. Using the luminescence emitted by the temperature-dependent luminophore, it is possible to analyse whether the temperature control of the device works accurately in such a setting and allows to accurately achieve the desired temperatures within the micro-environments. The desired temperature that is supposed to be achieved in the micro-environment can then be compared to the actual temperature that is achieved in the micro-environment based on the luminescence that is emitted by the temperature-dependent luminophore. Due to the data that was obtained in the first Optical Temperature Verification step, in particular the mapping of the relative luminescence of the luminophore to the absolute temperature, the absolute temperature that is achieved in the micro-environment(s) during the second Optical Temperature Verification step can be determined more accurately.

The temperature of the environment is preferably recorded simultaneously, e.g. using the temperature sensor that is comprised in the environment. The temperature of the micro-environment is usually varied by varying the temperature of the environment comprising the micro-environment. The obtained data can again be used to compare the determined environment temperature, which e.g. is determined by the temperature sensor, with the desired micro-environment temperature and/or the actual micro-environment temperature that is determined by the luminescence of the at least one temperature-dependent luminophore.

The obtained information from said second Optical Temperature Verification step can be used to make appropriate compensations in the temperature control system of the device where necessary so that the desired temperature is truly attained in the micro-environment.

Further features and preferred embodiments of the method according to the present invention will be described in further detail below.

According to one embodiment, at least two, preferably at least three different thermochromatic liquid crystals are used in the first Optical Temperature Verification step, wherein at least one of said thermochromatic liquid crystals has a specific event temperature that differs from the event temperature of at least one other of said thermochromatic liquid crystals. Preferably, the different TLCs are provided in separate micro-environments, wherein, however, the micro-environments have the same characteristics. Preferably, the optical property of different thermochromatic liquid crystals is measured. The number of different thermochromatic liquid crystals may indicate the number of temperatures at which the micro-environments are controlled for a reaction of a reaction mixture in the micro-environments. The event temperature of the different thermochromatic liquid crystals may correspond to the desired calibration temperatures.

Preferably, three different thermochromatic liquid crystals are used and the optical property of each of the thermochromatic liquid crystals is measured preferably at the same equilibrium state at which the luminescence, preferably the fluorescence intensity, of the temperature dependent luminophore is determined. The number of different thermochromatic liquid crystals increases the accuracy of the "mapping" and therefore, increases the accuracy of determining the temperature in a micro-environment based on the luminescence of said temperature-dependent luminophore in the second Optical Temperature Verification step. According to one embodiment, the event temperatures of the used TLCs differ by at least 10° C., preferably at least 15° C.

In a preferred embodiment, at least three different thermochromatic liquid crystals are used, wherein the first thermochromatic liquid crystal has an event temperature that lies in a range of 40° C. to 60° C., preferably 45° C. to 55° C., the second thermochromatic liquid crystal has an event temperature that lies in a range of 65° C. to 90° C., preferably 70° C. to 80° C. and the third thermochromatic liquid crystal has an event temperature that lies in a range of 85° C. to 95° C. Preferably, three thermochromatic liquid crystals are used having a event temperature of about 50° C., about 70° C. or 75° C., and about 90° C., respectively. More than one TLC of the same type can be used in the first Optical Temperature Verification Step. Using more than one TLC of the same type may further increase the accuracy.

When varying the temperature in steps and at each step obtaining an equilibrium state it is assumed that the temperature of the air of the environment and the liquid in the micro-environment is of the same value. However, it is mandatory to control that the temperature control works properly. The thermochromatic liquid crystal comprises at least one event temperature at which the optical properties suddenly change and wherein said change can be detected by the optical system. When choosing an appropriate thermochromatic liquid crystal having a specific event temperature, it becomes possible to determine the luminescence, preferably fluorescence intensity of the temperature dependent luminophore within the micro-environment at the event temperature. One advantage is that the fluorescence intensity can be determined under the same set-up/conditions with respect to the micro-environment (e.g. the used reaction vessel, the type of liquid used for receiving the luminophore, the used volume, the used luminophore concentration etc.) that is subsequently used in the second Optical Temperature Verification step wherein e.g. a dynamic temperature profile (e.g. a PCR profile) is run. Furthermore, the same set-up is preferably used for determining the temperature in the micro-environment that will be subsequently used in a real assay/reaction that is carried out with the device which preferably is a thermal cycler. The same set-up/conditions in this respect refers to the conditions and/or parameters that have a substantial influence on the optical characteristics, such as the reaction vessel, the used liquid which preferably is an aqueous solution, the used volume and the like. Thereby, e.g. the fluorescence intensity of the temperature-dependent fluorescent dye correlating to an absolute temperature can be determined which can be used further for analysing whether the temperature control is capable of establishing an accurate temperature in a respective micro-environment because of the "mapping" of the fluorescence intensity to the at least one, preferably at least two, more preferred at least three absolute temperatures. Therefore, the actual temperature of a micro-environment even in the case that the micro-environment is rotated in the chamber can be very accurately determined. The improvement in accuracy of determining the temperature is assumed to be 10% to 15%.

Preferably, a setting is chosen for the luminophore in the micro-environment which emulates the thermal properties of the reaction composition that is regularly processed by the device in a corresponding micro-environment. E.g. when performing an amplification reaction, a liquid, usually an aqueous solution is processed in the micro-environment. Therefore, for a respective device it is preferred to provide the luminophore in a liquid as well such as e.g. in an aqueous solution. The liquid samples comprising the luminophore, which preferably is a fluorophore, thereby have a characteristic that undergoes a detectable change with changes in temperature. Preferably, a fluorophore is used as temperature-dependent luminophore which undergoes a continuous change in fluorescence with temperature, thereby allowing a liquid temperature to be determined based on the liquid fluorescence. Suitable examples include fluorescent dyes such as Pyronin-Y. As micro-environment, preferably the same reaction vessels are used that are regularly used when the device is in use or reaction vessels are used which have the same optical or thermal characteristics. Furthermore, preferably, the volume of the liquid comprising the temperature dependent luminophore is chosen to be equal to the volume of a reaction mixture that is usually provided in the micro-environments. A volume of about 10 µl to about 100 µl, more preferred 10 µl to 50 µl is preferred. For differing volumes of the reaction mixture, preferably a separate verification is carried out in order to provide accurate results.

The fluorescence intensity of the temperature dependent luminophore and the optical property of the thermochromatic liquid crystal are determined in the same run, i.e. at substantially the same time, by holding the same temperature in the environment for obtaining the same conditions and a high accurate "mapping". According to one embodiment, the event temperature of a TLC is the or one of the temperature(s) of interest at which the reaction of the mixture in the micro-environments is to be carried out or is at least close to said reaction temperature (e.g. within a range of 5° C. to 10° C., e.g. if no appropriate TLCs are found that have an event temperature that is exactly at the reaction temperature).

Preferably, the fluorescence intensity measured at the event temperature is stored together with the event temperature for further use. As described above, the stored value of the fluorescence intensity can be used to calculate a function or map a function of the fluorescence intensity of the temperature dependent luminophore over the temperature. The measured and stored value of the fluorescence intensity offers the possibility to refer to the value(s) and fit the behaviour of the fluorescence intensity to the measured value(s).

The mapping of the fluorescence intensity to the event temperature(s) of the thermochromatic liquid crystal(s), i.e. absolute temperature(s), allows for determining a temperature behaviour of the luminophore used based on absolute temperature(s). Thus, it can be exactly determined how the temperature-dependent luminophore behaves in the concrete micro-environment setting at a specific absolute temperature, namely the event temperature. In a further run, a calibration or verification of the required temperature profile can be carried out. Thereby, it can be analysed whether the temperature control of the device works properly. E.g. the required thermal cycle/profile is carried out using the regular temperature sensor in the environment that is used in the device for controlling the temperature in the micro-environment. Additionally, the actually achieved temperature in the micro-environments is determined by use of the temperature-dependent luminophore and the result can be shown e.g. on a display. Appropriate adjustments can be done if the actual temperature in the micro-environments does not correspond to the desired temperature (or temperature range if a small variation is allowed). E.g. the actual temperature determined by use of the luminophore in the thermal cycle/profile may not only displayed but may also be used to modify the profile set by the temperature sensor in the environment to obtain an optimization of the temperature(s) in the micro-environment. The second Optical Temperature Verification step may be repeated until the desired accurate temperature control is achieved.

Preferably, the fluorescence intensity of two temperature dependent luminophores having different temperature dependence from each other is determined, wherein the two temperature dependent luminophores are preferably filled in separate micro-environments. The micro-environments preferably have the same characteristics. The two different temperature dependent luminophores differ in their temperature dependence and the first temperature dependent luminophore has a higher temperature sensitivity than the second temperature dependent luminophore.

Using two different temperature dependent luminophores will improve the accuracy of determining the temperature and thus the efficacy of the process to be carried out in a micro-environment of the chamber. In a preferred embodiment one of the two luminophores is sensitive to a temperature change having a greater temperature gradient, whereas the other of the two luminophores is less sensitive to a temperature change having a smaller temperature gradient. The fluorescence intensity of a luminophore being more sensitive to a temperature change is preferably modelled by an Arrhenius equation, whereas the fluorescence intensity of the luminophore being less sensitive to a change in temperature may be modelled by an empirical functional relation.

Thus, according to one embodiment, a model is used for determining the fluorescence dependency of the temperature dependent luminophores and which is an empirical functional relation FI(T)=FI(Tref)·f(T/Tref) in case of the first temperature dependent luminophore and an Arrhenius equation $$FI(T) = FI(Tref) \cdot e^{c\left(\frac{1}{T} - \frac{1}{Tref}\right)}$$

in case of the second temperature dependent luminophore; where FI(T) is a fluorescence intensity at a temperature T given in Kelvin; FI(Tref) is a fluorescence intensity at a reference temperature Tref given in Kelvin; c=Enr/R, where Enr is the activation energy of the non-radiative process and R is the gas constant.

The use of the appropriate equation for modelling the fluorescence dependence of the luminophore will further improve the method.

In case that two or more luminophores are used in the first step of the method, it is preferred that the concentration of the luminophores at a temperature in the middle region of the temperature range of interest is chosen in such a way that the fluorescence intensity of each of the different luminophores is substantially of the same value for the temperature in the middle region of the temperature range of interest. This will improve the measurement of the fluorescence intensity by obtaining a high signal to noise ratio and thus improve the accuracy of the temperature measurement.

In a preferred embodiment the quotient of the measured fluorescence intensities of the two different temperature dependent luminophores at the same temperature is determined (high sensitive temperature dependent luminophore/less sensitive temperature dependent luminophore) which will provide an improvement with regard to an accurate reproducible temperature measurement which is as well independent of a change of the optical system used to irradiate and to detect the fluorescence, i.e., the temperature of a light source and/or a photomultiplier tube. Thus, the use of two different temperature dependent luminophores as taught by the invention allows to eliminate the drift of the detection system. This is an important advantage as optical drifts will result in a temperature measurement with a cumulative error. Thus, the second luminophore, which preferably is a fluorescent dye, allows to compensate the drifts in the optical system by a mathematical method. This is a particular advantage when using a device such as e.g. a thermal cycler which does not comprise a reference channel for compensating drifts in the optical system.

As described above, preferably, a simultaneous melt point determination of three sets of TLCs is performed, wherein each TLC has a different event temperature and the fluorescence intensities of the used at least two temperature sensitive fluorescence dyes is monitored. Before the temperature verification of a real PCR-profile may start in the second Optical Temperature Verification, a static First Optical Temperature Verification as described above using thermochromatic liquid crystals is performed. Having the actual absolute temperature at three discrete points and having the corresponding fluorescence of the dyes, a mapping (in the least square sense) of the relative fluorescence of the dyes to the absolute temperature may be achieved. The reference temperature Tref. is preferably chosen in the middle of the range at a temperature between 65° C. and 80° C., preferably 70° C. and 80° C., most preferred it is about 75° C.

Preferably, two different temperature-dependent luminophores having substantially the same optical characteristic are used to improve the accuracy of the temperature determination. The term "optical characteristic" is to be understood as having substantially the same emission as well as adsorption spectra such that filters having a specific window used in the optical path can be appropriately used for both of the two different luminophores. Preferably, the wavelength of the peak in the emission/adsorption spectrum for both of the luminophores lies within a range of about 50 nm, preferably, 25 nm, more preferred 20 nm, most preferred 15 nm. Thus, the excitation and emission spectra of the two luminophores as well as their relative position within the window given by the filter should match as good as possible.

In particular the temperature coefficient of a luminophore indicates its temperature sensitivity. The absolute value of the temperature coefficient of a luminophore having a temperature sensitivity higher than another luminophore is higher than the absolute value of the temperature coefficient of the another luminophore. The absolute value of the temperature coefficient of a luminophore having a higher temperature sensitivity might be at least 2.5%/° C., at least 3%/° C., at least 3.5%/° C., at least 4%/° C., at least 4.5%/° C. or at least 5%/° C. The absolute value of the temperature coefficient of a luminophore having a higher temperature sensitivity might be in the range of 2.5%/° C., preferably 4.5%/° C. to 7.5%/° C., wherein even higher temperature coefficients are suitable. A luminophore having a smaller temperature sensitivity comprises preferably an absolute value of the temperature coefficient that is equal to or less than 2.5%/° C., equal to or less than 2%/° C., equal to or less than 1.5%/° C. or equal to or less than 1%/° C. The absolute value of the temperature coefficient of a luminophore having a smaller temperature sensitivity might be in the range of 0.3%/° C. to 2.5%/° C., wherein even smaller values might be used, however, the change in fluorescence intensity has to be above the detection limit. More preferably, the temperature sensitivity of two luminophores is related to the ratio of the temperature coefficients of the respective luminophores. The ratio of the temperature coefficients of a luminophore having a higher temperature sensitivity and a luminophore having a smaller temperature sensitivity is according to one embodiment at least 1.5, more preferably at least 2.0, even more preferably at least 2.5 and most preferably at least 3.0.

Preferably, Pyronin-Y is used as highly sensitive temperature dependent luminophore. Pyronin-Y has a temperature coefficient of approx. −5.5%/° C. As less sensitive temperature-dependent luminophore, preferably Atto 532 is used. Atto 532 has a temperature coefficient of approx. −1.4%/° C. However, also other temperature dependent luminophores, preferably temperature dependent fluorescent dyes, can be used. E.g. HEX, 6-carboxy-2',4,4',5',7,7'-hexachlorofluorescin can also be used as less temperature dependent fluorescent dye. It has a temperature coefficient of less than approx. −0.5%/° C. Respective dyes are e.g. described in Liu and Sullivan, Pressure and Temperature Sensitive Paints, 2004 (ISBN-10: 3540222413).

According to one embodiment, the thermochromatic liquid crystal is used in combination with a luminophore in one micro-environment. In a preferred embodiment the thermochromatic liquid crystal is positioned at least partially before or behind said luminophore in relationship to the optical path of the optical system. Using a respective thermochromatic liquid crystal/luminophore combination basically serves the purpose to sensitively indicate when the event temperature of the thermochromatic liquid crystal is reached within the micro-environment as then, the luminescence of the thermochromatic liquid crystal/luminophore combination changes sharply. A respective thermochromatic liquid crystal/luminophore combination is e.g. described in WO 03/102522. Such combination can be used in the present invention in combination with the one or more temperature dependent luminophores, As described above, the one or more temperature dependent luminophores which are also used for determining the temperature in a micro-environment based on the emitted luminescence (which depends on the temperature) preferably are provided in separate micro-environments, such as in particular separate reaction vessels, as described herein. By using this arrangement the same optical elements, i.e. especially filters, can be used when determining the fluorescence intensity of the temperature-dependent luminophore. No switching to another channel of the optical system is required in case that such an arrangement is used. Preferably, the thermochromatic liquid crystal is contained in a reaction vessel such as a vial or tube as micro-environment, which is coated by the luminophore. The luminophore does not need to be identical to one of the used temperature-dependent luminophores. The luminophore used does not even need to be temperature dependent. However, the same temperature dependent luminophore that is used for measuring the fluorescence intensity may be used for the ease of simplicity. The tube or vial can be coated from the outside or the inside with the luminophore. The luminophore may also be incorporated in the wall of the vial or tube by injection-moulding during the manufacture of the vessel or vial which is typically made of plastic. According to a further embodiment, clear reaction vessels or vials are used for the TLC, which do not comprise any stokes shifting generating insert. Here, it is preferred to use e.g. a red LED (625 nm) and a filter which is wide open towards longer wavelength such as the filter 610 hp. A respective set-up can be e.g. used together with the fluorescent dyes Pyronin-Y and Atto 532 or temperature-dependent fluorescent dyes having similar excitation and emission characteristics.

Preferably, in step c) of the first Optical Temperature Verification step the temperature is varied by using a temperature profile having a start point and an end point, wherein a step size for the heating between the start point and the end point is set to be smaller than 1° C., preferably set to about 0.1° C. to 0.2° C., and a hold-time for each step is set to be greater than 10 seconds. Preferably, the hold-time is set to about 20 and most preferable to about 30 seconds. According to one embodiment, the temperature variation in step c) is in increments of about 0.1° C. The start point and the end point are preferably set to a temperature of about +1-2.5, preferably 1.5 of the nominal melting point of the TLC. This "gentle" temperature profile during calibration will lead to a measurement of almost a steady or equilibrium state which in turn improves the calibration process and determining the temperature.

According to one embodiment, in step b) of the second Optical Temperature Verification a dynamic temperature profile is run which comprises several different temperature steps, and wherein at least one of said temperature steps differs from the event-temperature of at least one thermochromatic liquid crystal. As described above, a respective dynamic temperature profile may correspond to a PCR profile.

According to one embodiment, the influence of erroneous measurements of the fluorescence intensity is reduced by averaging measurements of micro-environments containing the same and/or neglecting measurements that exceed a threshold given in percent over each of the other measured fluorescence intensities.

According to a preferred embodiment, the one or more different thermochromatic liquid crystals and the one or more of the different temperature dependent luminophores are provided in separate micro-environments. Thus, each differing compound/element is comprised in a separate micro-environment. It is preferred to provide the individual temperature-dependent luminophores as well as the different TLCs in multiple sets. This again increases the accuracy. Preferably, when arranged in a rotor of a thermal device, the TLCs are grouped together and the temperature-dependent luminophores are provided in an alternate setting.

Preferably, after the first Optical Temperature Verification step has been performed, the thermochromatic liquid crystal(s) are removed prior to performing the Second Optical Temperature Verification step. As described above, the first Optical Temperature Verification step is performed using a gentle temperature profile. However, in the second Optical Temperature Verification step a temperature profile realistic for the respective device is used, e.g. a PCR profile. This might decrease the live-time of the TLCs dramatically. Therefore, it is preferred to use the TLCs only in the first Optical Temperature Verification step to do the mapping of the luminescence of the used temperature-dependent luminophores (wherein preferably two luminophores are described above are used and the quotient is formed) to an absolute temperature that is signalled by the TLCs. Later, in the second Optical Temperature Verification step they are removed and e.g. replaced by water.

As described above, the micro-environment preferably is a reaction vessel, respectively corresponds to a liquid comprised in a reaction vessel as described above.

The device preferably is a thermal cycler. It will be appreciated from the above that the device is particularly directed to thermal cyclers for nucleic acid amplification, wherein the reaction vessels are supported on a rotatable circular carousel rotatably mounted within a chamber. Particularly preferred thermal cyclers for use with the apparatus are the Rotor-Gene™ family of thermocyclers manufactured and distributed by Qiagen GMBH (www.giagen.com), most preferably the Rotor-Gene Q. Other similar devices are disclosed in International PCT Publication No.'s WO 92/20778 and WO 98/49340. However, it will be appreciated that other commercially available thermal cyclers may be modified to operate as described above.

The optical system already present in the thermal cycler can be used to accurately determine the fluorescence intensity of the temperature dependent luminophore as well as the optical property of the at least one thermochromic liquid crystal. Thus, the optical system that is used for performing the method according to the present invention might be the optical system which is provided in the device, which preferably is a thermal cycler, to sense the status of a reaction based on the color of an indicator in a reaction mixture contained in the micro-environment. The optical system can include an illumination source, such as an LED, and a corresponding optical detector, e.g. a photomultiplier for detecting reflected illumination.

According to a second aspect, the present invention provides a system for verifying or calibrating the temperature control of a thermal air cycler comprising a rotor comprising receptacles for micro-environments, wherein said rotor comprises in micro-environments a) two or more different thermochromatic liquid crystals, each thermochromatic liquid crystal having a different event temperature, and b) one or more temperature-dependent luminophore.

The details of a respective system, in particular the microenvironments, the TLCs and the temperature-dependent luminophores were described in detail above and it is referred to the respective disclosure which also applies here. Thus, subsequently only few particularities are again described. Preferably, the different thermochromatic liquid crystals and the one or more temperature-dependent luminophores that are used for measuring the luminescence at different absolute temperatures are provided in different, i.e. separate micro-environments. As described above, they are, however, each to be measured in one cycle. E.g. each thermochromatic liquid crystal and each different temperature dependent luminophore used can be placed in separate reaction vessels which are placed in separate receptacles of the rotor. Embodiments are shown in the examples. Preferably, the system comprises two different temperature dependent luminophores which differ in their temperature dependence. The first temperature dependent luminophore has a higher temperature sensitivity than the second temperature dependent luminophore. Said two different temperature dependent luminophores preferably have substantially the same optical characteristics in particular with respect to their excitation and emission behaviour. Preferably, Pyronin-Y and Atto 532 are comprised as luminophores. The event temperatures of the different thermochromatic liquid crystals differs preferably by at least 10° C., preferably at least 15° C. As described above, preferably three different TLCs are used. Their characteristics are described above. A respective system can be used in a method according to the first aspect.

According to a third aspect, the present invention pertains to an optical method for analysing the temperature control of a device which is supposed to establish a defined temperature in a micro-environment, wherein said method is based on the use of a temperature dependent fluorophore, wherein at least two different temperature dependent luminophores differing in their temperature dependence are used for compensating the optical drift of the optical system and determining the quotient of the fluorescence intensities of the first temperature dependent luminophore and the second temperature dependent luminophore at the same temperature. The first temperature dependent luminophore has a higher temperature sensitivity than the second temperature dependent luminophore. As described above, said two different temperature dependent luminophores preferably have substantially the same optical characteristics in particular with respect to their excitation and emission behaviour. The details for measurement of the two temperature dependent luminophores differing in their temperature dependence were described in detail above and it is referred to the respective disclosure which also applies here.

This invention is not limited by the exemplary methods and materials disclosed herein. Numeric ranges are inclusive of the numbers defining the range. The headings provided herein are not limitations of the various aspects or embodiments of this invention which can be read by reference to the specification as a whole. According to one embodiment, subject matter described herein as comprising certain steps in the case of methods or as comprising certain components refers to subject matter consisting of the respective steps or components. It is preferred to select and combine preferred embodiments described herein and the specific subject-matter arising from a respective combination of preferred embodiments also belongs to the present disclosure.

BRIEF DESCRIPTION OF THE DRAWINGS

Examples of the invention will now be described with reference to the accompanying drawings in which.

DETAILED DESCRIPTION OF PREFERRED EMBODIMENTS

Figure 1:
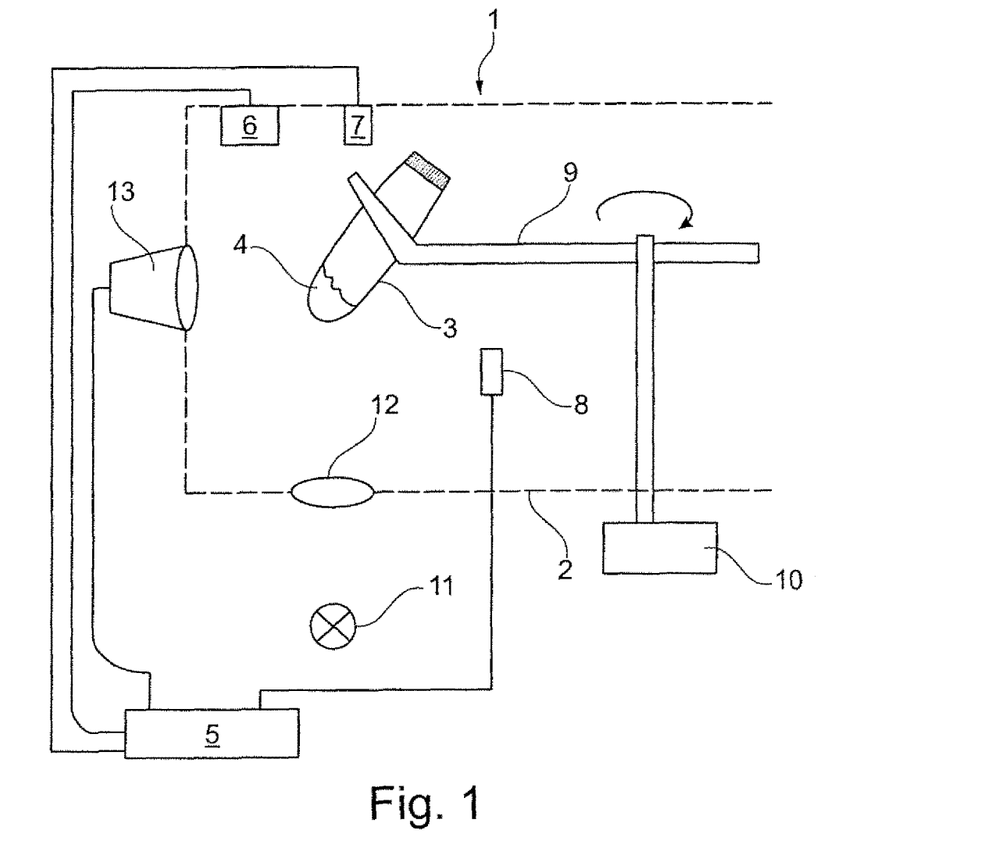
FIG. 1 is a schematic diagram of an apparatus for detecting and optionally controlling the temperature of a micro-environment.

FIG. 1 schematically depicts an apparatus 1 for detecting and optionally controlling the temperature of a liquid contained in a vial or tube during a thermal cycling process. The apparatus 1 might be part of or be a PCR cycler or a thermal cycler.

The apparatus 1 includes a chamber 2 establishing an environment and containing at least one reaction chamber as a micro-environment 3 which might contain a liquid 4 therein such as a reaction mixture. The apparatus 1 typically includes a controller 5, for example a processor, coupled to a heater 6 and a cooler 7. The heater 6 is typically a convection heater, or similar, arranged to heat air in the chamber 2. Heating/cooling the chamber 2 will influence the temperature of the micro-environment 3 and thus the temperature of the liquid 4. The cooler 7 might be a fan. In the chamber 2 a temperature sensor 8 is arranged which is connected to the controller 5. With the temperature sensor 8 the temperature of the air inside the chamber 2 can be sensed by the controller 5. Further, the controller 5 is operatively connected to the heater 6 and the cooler 7.

In use, the controller 5 typically executes instructions to allow the apparatus to be controlled. In this regard, a user will typically select a desired thermal cycling process, including a required temperature profile. This allows the controller 5 to access the instructions and control the apparatus 1 to thereby cause the apparatus 1 to implement the selected thermal cycling process.

The micro-environment 3 is formed by a tube or vial which is arranged in a receptacle of a rotatable rotor 9, wherein the rotor 9 comprises preferably 60 or 72 receptacles to accommodate a respective number of tubes or vials, i.e., the micro-environments 3.

The rotor 9 may comprise segments to achieve a fast and easy to handle replacement of several of the micro-environments 3 being accommodated in the receptacles of the rotor 9. A motor 10 is provided by which means the rotor 9 can be rotated.

The controller 5 can access, i.e., write and/or read, a memory in which a table is stored according to which the controller can identify the content of the micro-environments 3 accommodated in the receptacles of the rotor 9.

For investigation purposes each micro-environment 3 can be placed by rotating the rotor 9 in a position that the micro-environment 3 and thus the content therein can be irradiated by a light source 11, which is preferably a LED, arranged outside the chamber 2. The light emitted from the light source 11 passes a filter 12 on the optical way in the chamber 2. A light detector 13 is provided outside the chamber 2 for detecting light intensity as a function of wavelength. The detector 13 might comprise a filter as well as a photomultiplier tube. The detector 13 being operatively connected to the controller 5 for receiving the measured fluorescence intensity as well as for setting a gain of the detector 13.

In case that the micro-environment 3 contains a temperature dependent luminophore, especially in the form of an aqueous solution with a pre-determined concentration, the temperature dependent luminophore in the micro-environment 3 can be irradiated by the light source 11 when the controller 5 rotates the rotor 9 in the respective position. After irradiating the temperature dependent luminophore in the micro-environment 3 the emitted fluorescence intensity is detectable by the detector 13.

With the signal of the temperature sensor 8 it is possible to obtain the temperature sensed by the temperature sensor 8 in the chamber 2 at the same time at which the fluorescence intensity of the micro-environment 3 is determined. Thus, it can be determined the correlation of the temperature in the micro-environment 3 to the temperature of the chamber 2.

Further, the fluorescence intensity as a function of the temperature for a specific temperature dependent luminophore is stored in a table (or a model or a function) in a memory which can be accessed by the controller 5 such that when determining the fluorescence intensity by the detector 13, it will be possible to determine the temperature in the micro-environment 3 in accordance with the stored table or model of the temperature dependent luminophore accessible by the controller 5.

Figure 2:
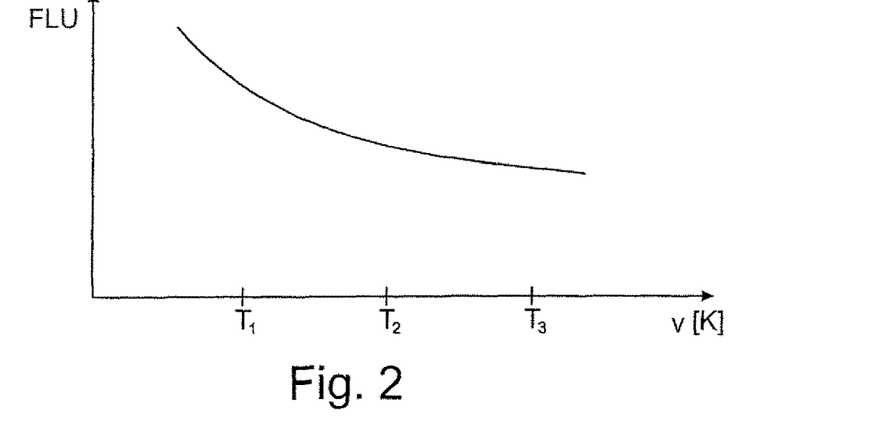
FIG. 2 is a schematic plot of the fluorescence intensity over the temperature for a temperature dependent luminophore.

In FIG. 2 an example of a plot of the fluorescence intensity over the temperature is shown for a temperature dependent luminophore. It can be seen that the fluorescence intensity clearly indicates the temperature at which the fluorescence intensity is measured. Thus, the temperature of the temperature dependent luminophore can be determined by measuring the fluorescence intensity emitted by the luminophore by means of the detector 13.

In case that two different temperature dependent luminophores having different temperature dependence from each other are used in two respective micro-environments 3, i.e., at least two vials or tubes in the rotor 9 are filled with an aqueous solution of the respective luminophore in a pre-determined concentration, the fluorescence intensity of each of the two temperature dependent dyes can be measured. According to the table with which the content of each micro-environment 3 can be identified, it becomes possible to obtain the fluorescence intensity of each of the temperature dependent luminophores.

Figure 3:
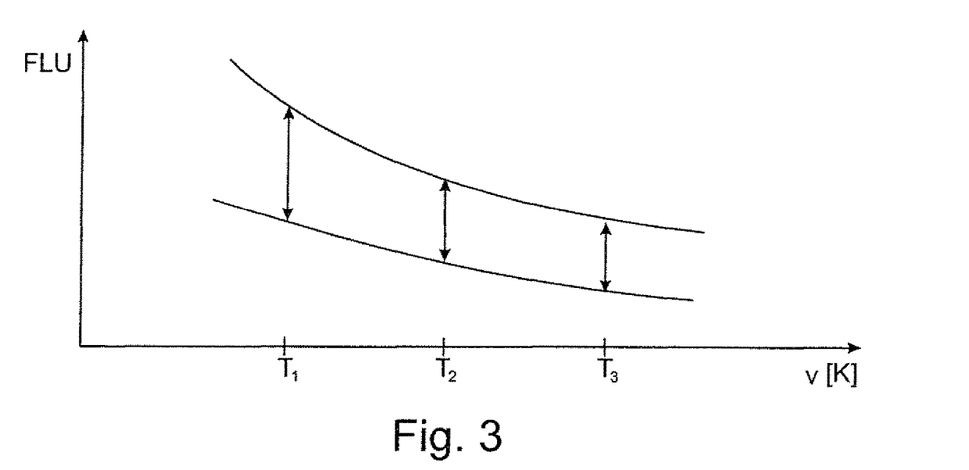
FIG. 3 is a schematic plot of the fluorescence intensity over the temperature for two temperature dependent luminophores having different temperature dependence from each other.

Using two temperature dependent luminophores having different temperature dependence from each other it becomes possible to compensate the drift in the optical system when using the differentiated fluorescence intensity. This is indicated in FIG. 3 in which the fluorescence intensity is plotted over the temperature for two temperature dependent luminophores having different temperature dependence from each other. Using the two different temperature dependent luminophores, the temperature of the micro-environment 3 is determined by using the differentiated fluorescence intensity of the two temperature dependent luminophores and not the absolute fluorescence intensity of a single luminophore. As differentiated fluorescence intensity the quotient of the fluorescence intensity of the two different temperature dependent luminophores can be used.

However, before the temperature verification of a real PCR-profile may start, a static optical temperature verification using thermochromatic liquid crystals might be performed. This will allow an absolute temperature measurement and increase accuracy of the temperature measurement.

The number of different thermochromatic liquid crystals used for the optical temperature verification will increase the number of absolute temperatures to which the fluorescence intensity can be mapped. In case that three different thermochromatic liquid crystals will be used, this will allow an absolute temperature measurement at three discrete temperatures.

Preferably the thermochromatic liquid crystals are chosen such that the event temperature of the liquid crystals is equal or near to the specific temperature which is required for the process/step of the process of interest and which is to be maintained during a process/step of the process in the micro-environment 3. In case the apparatus 1 is a PCR cycler, at least two different thermochromatic liquid crystals with melting points at about 50° C., about 75° C., and about 90° C. might be used.

To obtain the actual absolute temperature, the optical property of the thermochromatic liquid crystals is observed. Simultaneously the fluorescence intensity of the temperature dependent luminophores is monitored and mapped to the absolute temperature. Having the actual absolute temperature at three discrete points and having the corresponding fluorescence intensity of a fluorescence temperature dependent dye in a liquid 4 of the micro-environment 3, a mapping (in the least square sense) of the relative fluorescence intensity of the fluorescence dependent dye 3 to the absolute temperature may be achieved.

The measured fluorescence intensity of a temperature dependent luminophore in the liquid 4 or as the liquid 4 of the micro-environment 3 is considered as a function of the following parameters:

$$FI(T, c_{dye}, c_{io}, g(t)),$$

where T is the temperature within the micro-environment 3 containing the aqueous solution of the luminophore; $c_{dye}$ is the concentration of the dye in the aqueous solution, which is considered to be invariant in time, $c_{io}$ is a constant referring to the micro-environment 3 and describing how efficient the light is coupled into and coupled out of the micro-environment 3, the constant $c_{io}$ is considered to be invariant in time; and $g(t)$ is an overall "gain" of the acquisition system consisting of the light source 11 and the photomultiplier tube of the detector 13 as a function of time (the actual gain is mainly influenced by the temperature of the light source 11, however, the actual temperature of the light source 11 and the photomultiplier tube is not available).

Figure 4:
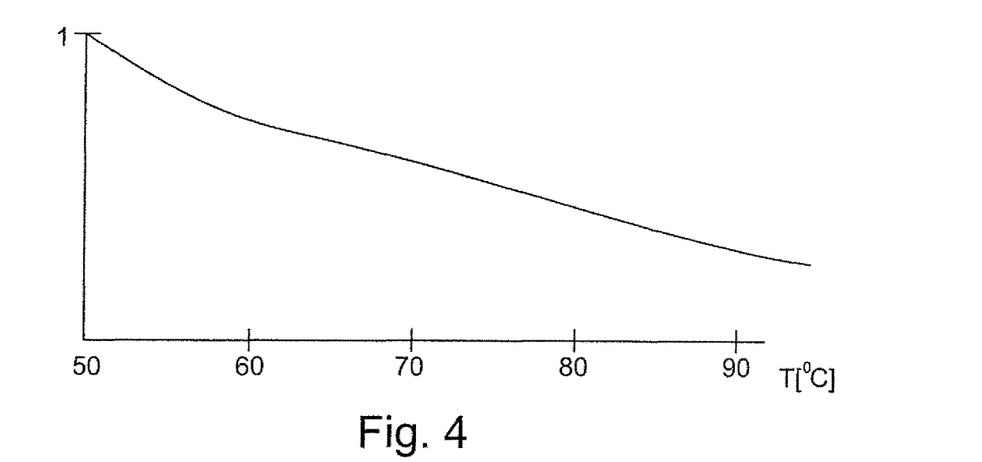
FIG. 4 is a schematic plot of the fluorescence intensity of a first temperature dependent luminophore divided by the fluorescence intensity of a second temperature dependent luminophore over the temperature.

By means of the calibration process using two different temperature dependent luminophores it is possible to separate the time dependent (varying over the investigation period) and the time dependent factors influencing the measurement. The time dependent terms should be eliminated by division. Thus, the calibration process achieves a correct mapping of the time independent factors cdye and cio to a curve which is schematically shown in FIG. 4. FIG. 4 schematically shows the result of the fluorescence intensity of a highly temperature sensitive dye (Pyronin-Y) divided by the fluorescence intensity of a low temperature sensitive luminophore (Atto 532).

The acquisition of the readouts in case that two temperature dependent luminophores having different temperature dependence has to be done for each of the two luminophores with equal gain-settings to allow a comparison of the fluorescence intensity measured for each of the two luminophores having different temperature dependence.

Since the rotor 9 comprises several receptacles it is preferred to measure not only the fluorescence of only one micro-environment 3 containing a temperature dependent luminophore but a number of micro-environments 3 containing the same temperature dependent luminophore in almost the same concentration and the same volume. Averaging over the number of micro-environments 3 containing a specific temperature dependent luminophore at a specific concentration should result in an improvement of the signal to noise ratio.

In case that a rotor 9 with 72 receptacles and thus 72 vials/tubes/micro-environments 3 is used the following rotor-layout is used: 30 of the micro-environments 3 are filled with a first of the two temperature dependent luminophores having different temperature dependence from each other and 30 of the micro-environments 3 are filled with a second of the two temperature dependent luminophores having different temperature dependence from each other. Preferably, the luminophores are filled in the micro-environments 3 in alternating order. The measurement of 30 micro-environments 3 with the same luminophore having the same concentration will improve the signal to noise ratio by $\sqrt{30}=5.48$.

Using at least two or more micro-environments 3 with substantially the same content of a temperature dependent luminophore will lead to minimizing errors occurring by a measurement because averaging of the measured fluorescence intensity can be performed. Using at least three or more micro-environments 3 with substantially the same content of a temperature dependent luminophore will lead to minimizing errors by possible excluding a measurement that exceeds over a pre-determined threshold given in percentage in relation to the measured fluorescence intensity for each of the other measurements.

For the two different temperature dependent luminophores having different temperature dependence from each other Pyronin-Y and Atto 532 are used. The excitation and emission spectra of the two dyes as well as their relative position within the window of the filter in the detector 13/or the filter 12 match very good. An excitation filter with a central wavelength of 530+/−2 nm and the full width at half maximum of 10+/−2 nm can be used. An emission filter with a central wavelength of 557+/−2 nm and a full width at half maximum of 10+/−2 nm can be used. Thus, the yellow channel of a PCR cycler—in case that the apparatus 1 is a PCR cycler—can be used.

By using two different temperature dependent luminophores with "matching" excitation/emission spectra and relative position within a window given by the filter(s) in the optical pass, it becomes possible to obtain a good signal to noise ratio, because the filter can be used which is appropriate for the measurement of both of the two different temperature dependent luminophores.

Figure 5:
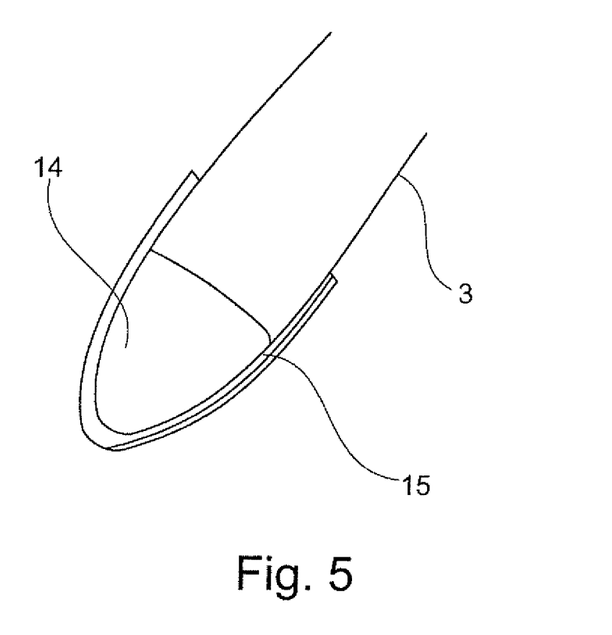
FIG. 5 is a schematic diagram of a thermochromatic liquid crystal contained in a micro-environment, the micro-environment being painted with a luminescence dye to simplify the detection of the event temperature.

When a micro-environment 3 schematically depicted in FIG. 5 is used, it is possible to accurately observe the event temperature of a TLC 14 with the optical system used for measuring the fluorescence intensity of the temperature dependent luminophores contained in other micro-environments 3 accommodated in the rotor 9. The micro-environment 3 shown in FIG. 5 is painted with an appropriate respective luminophore 15 to achieve a frequency shift from 530 nm (green excitation) to 557 nm (yellow detection). By monitoring the output of the detector 13 when irradiating the micro-environment 3 shown in FIG. 5 and heating the chamber 2, it can be determined when the optical property of the TLC 14 contained in the micro-environment 3 suddenly changes at the event temperature.

However, clear micro-environments 3 might be used in conjunction with a red LED as a light source 11 emitting a light with a wavelength of around 625 nm and a filter which is wide open towards longer wavelength (610 hp).

The micro-environments 3 containing the TLCs should be separated from the micro-environments 3 containing the temperature dependent luminophores. The optical temperature verification is done using a "gentle" melt-profile. The use of a realistic PCR-profile with overshots might decrease the life-time of the TLCs dramatically. Thus, the TLCs are used only in the beginning to do the mapping of the fluorescence intensity measured from the two temperature dependent luminophores, i.e., Pyronin-Y and Atto 532, to an absolute temperature together with the at least one temperature dependent luminophore. After the mapping the micro-environments 3 with the TLCs may be replaced by a rotor-segment consisting of empty micro-environments 3/tubes/vials. The second Optical Temperature Verification step is then performed only with the temperature dependent luminophores.

Figure 6:
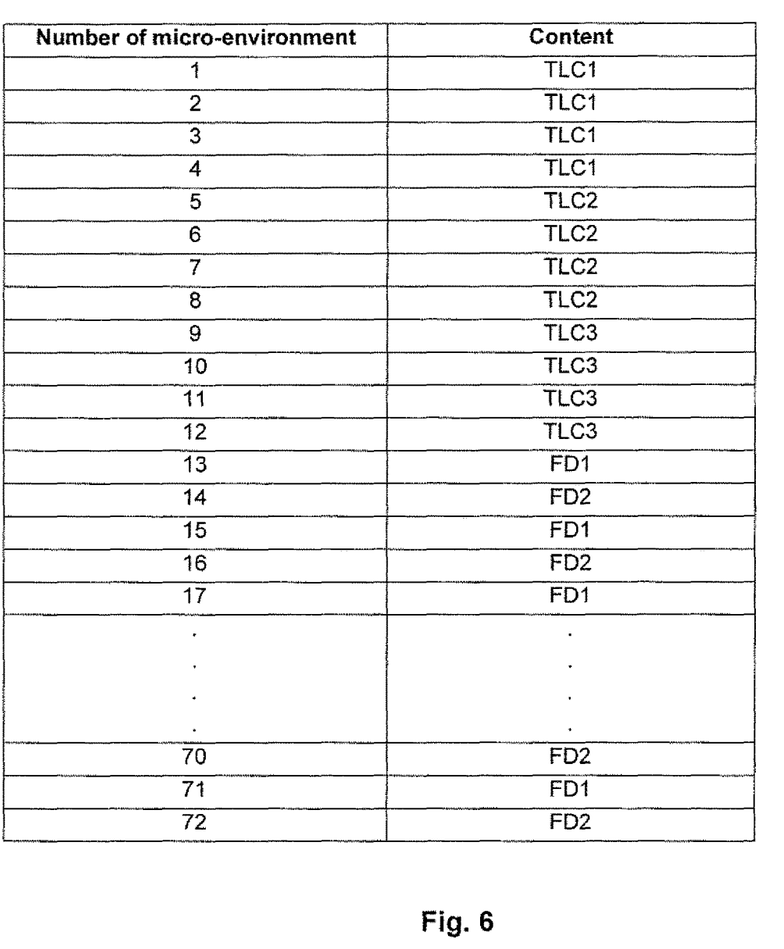
FIG. 6 is a table for a rotor-layout schematically depicting a content of each of the micro-environments.

FIG. 6 is an example of the rotor-layout, i.e., a content of the micro-environments 3 of a rotor 9 with 72 receptacles for the micro-environments 3. TLC1 indicates the TLC melting at about 50° C., TLC2 indicates the TLC melting at about 75° C., TLC3 indicates the TLC melting at about 90° C., FD1 indicates the first temperature dependent luminophore, and FD2 indicates the second temperature dependent luminophore. In receptacles 18 to 69 micro-environments comprising the temperature dependent luminophores FD2 and FD1 are arranged alternating.

Having the actual absolute temperature at three discrete points and having the corresponding fluorescence of the temperature dependent luminophores, a mapping of the relative fluorescence intensity of the temperature dependent luminophores to the absolute temperature may be achieved.

The temperature dependency of the fluorescence intensity can be modelled either by an arrhenius equation $$FI(T) = FI(Tref) \cdot e^{c\left(\frac{1}{T} - \frac{1}{Tref}\right)},$$

where FI(T) is a fluorescence intensity at a temperature T given in Kelvin; FI(Tref) is a fluorescence intensity at a temperature Tref given in Kelvin (and chosen to be in the temperature range of interest); c is Enr/R, where Enr is the activation energy of the non-radiative process and R is the gas constant; Tref is the reference temperature measured in Kelvin and T is a temperature measured in Kelvin. In the example of a PCR cycler being the apparatus 1, Tref is preferably set to 75° C. The Arrhenius equation fits best for the Pyronin-Y.

Or the temperature dependence of the fluorescence intensity can be modelled by a simpler heuristic approach using a fit $$FI(T)=FI(Tref) \cdot f(T/Tref),$$

where f is a polynomial, exponential or other function. The quantum yield of Atto 532 is much less sensitive to temperature than the one of Pyronin-Y so that an Atto 532 is modelled by the simpler heuristic approach.

The "optical drift compensated" fluorescence intensity, i.e., the fluorescence intensity of Pyronin-Y divided by the fluorescence intensity of Atto 532 (schematically shown in FIG. 4) may be modelled by the following equation:

$$Flu.Py-Y(T)/Flu.Atto(T) = \frac{a \cdot e^{b \cdot \frac{T}{Tref}}}{c \cdot \left(\frac{T}{Tref}\right)^2 + d \cdot \frac{T}{Tref} + 1},$$

where Tref=343.15K, a=0.9959, b=4,597.7, c=−385,190, and d=1,487.8.

Even when an environment 2 is used, for example a PCR cycler, which does not allow for an independent measurement of the temperature of the light source 11, for example the LED, the usage of two luminophores having a different temperature sensitivity will allow to compensate for any drifts in the optical/detection system.

Next, a detailed operation of a thermal verification (calibration) of a temperature profile in a PCR cycler, especially a PCR cycler of the Rotor-Gene™ family manufactured and distributed by Qiagen GMBH (www.giagen.com), most preferably the Rotor-Gene Q, is given:
1) The three nominal melting points of the thermochromatic liquid crystals are input by a user or a software executed by the controller 5 does parse them from the serial number of the rotor 9 (entered by the user).
2) The user places the segment of the rotor 9 containing the luminophores in the rotor 9. When using Pyronin-Y and Atto 532 a Py-Y-/Atto-segment can be used.
3) The user places the segment of the rotor 9 comprising the thermochromatic liquid crystals in the rotor 9.
4) The user is prompted to select a profile, for which the temperature in the micro-environment 3 should be monitored/validated.
5) The user starts the calibration process (the initial mapping of the measured relative fluorescence intensity of the two luminophores to an absolute temperature given by the melting points of the thermochromatic liquid crystals:
   The software performs an auto-gain-calibration on the yellow-channel at the lowest temperature occurring in the selected profile on the micro-environments 3/tubes containing Pyronin-Y. The target fluorescence (mean of all Pyronin-Y containing micro-environments 3) is 90+/−5 given in arbitrary units of the fluorescence intensity, the corresponding gain is stored.
   The software does a preconditioning at the mid-temperature (at about 75° C.) of the standard OTV-procedure.
   The software does an auto-gain calibration on the red channel "without stokes shift" (i.e. LED 625 nm/emission filter 610 hp). The target fluorescence of the TLC comprising micro-environment 3 with the melting point of about 75° C. (mean of the corresponding TLC-containing micro-environments 3) is 50+/−5 given in arbitrary units of the fluorescence intensity. The corresponding gain is stored.
   The software starts a melt profile around (+/−1.5° C.) the nominal melting point (about 75° C.) of the mid-temperature thermochromatic liquid crystal. Step size is 0.2° C. and hold-time is 30 s. The melt profile comprises two acquisitions on yellow channel and on the red "no stokes shift" channel.
   The software does a preconditioning at h highest temperature (at around 90° C.) of the standard OTV-procedure.
   The software does an auto-gain calibration on the red channel "without stokes shift" (i.e. LED 625 nm/emission filter 610 hp). The target fluorescence of the TLC comprising micro-environment 3 with the melting point of about 90° C. (mean of the corresponding TLC-containing micro-environments) is 50+/−5 given in arbitrary nits of the fluorescence intensity. The corresponding gain is stored.
   The software starts a melt profile around (+/−1.5° C.) the nominal melting point (about 90° C.) of the high-temperature thermochromatic liquid crystal. Step-size is 0.2° C. and hold-time is 30 s. The melt profile comprises two acquisitions on yellow channel and on the red "no stokes shift" channel.
   The software does a preconditioning at the lowest temperature (at about 50° C.) of the standard OTV-procedure.
   The software does an auto-gain calibration on the red channel "without stokes shift" (i.e. LED 625 nm/emission filter 610 hp). The target fluorescence of the TLC comprising micro-environment 3 with the melting point of about 50° C. (mean of the corresponding TLC-containing micro-environments) is 50+/−5 given in arbitrary nits of the fluorescence intensity. The corresponding gain is stored.
   The software starts a melt profile around (+/−1.3° C.) the nominal melting point (about 50° C.) of the low-temperature thermochromatic liquid crystal. Step-size is 0.2° C. and hold-time is 30 s. The melt profile comprises two acquisitions on yellow channel and on the red "no stokes shift" channel.
   The melting points of the three TLCs are determined. The corresponding fluorescence intensity in arbitrary units of the micro-environments 3 with the two luminophores (Pyronin-Y and Atto 532) are used together with the nominal melting points of the TLCs to scale the pre-determined model behaviour to the current setup.
6) The user is prompted to replace the segment of the rotor 9 comprising the micro-environments 3 containing the TLCs with micro-environments 3 filled with water or being empty.
7) The user confirms the requested user action.
8) The software starts a profile execution with continuous acquisition on yellow channel. Normal acquisitions defined in the profile are replaced by a prolonged (4 seconds) hold.
9) The continuous acquisitions on yellow channel are mapped to absolute temperatures. Series consisting of timestamps and measured temperatures are stored.

The invention claimed is:
1. A method suitable for analysing temperature control of a device that is adapted to establish a defined temperature in a micro-environment, said method comprising a first Optical Temperature Verification that comprises
   a) providing one or more thermochromatic liquid crystals in the micro-environment, wherein each thermochromatic liquid crystal has a specific event temperature, b) providing one or more temperature dependent luminophores in the micro-environment, c) varying the temperature in the micro-environment and irradiating the micro-environment with light, d) recording the luminescence of the one or more temperature dependent luminophores when the event temperature of the one or more thermochromatic liquid crystals is reached in the micro-environment, wherein in d), specific luminescence intensity of a temperature dependent luminophore in the micro-environment is correlated to a specific absolute temperature within the micro-environment, wherein said absolute temperature in the micro-environment is being indicated by a change in optical characteristics of the thermochromatic liquid crystal.

2. The method according to claim 1, wherein a) of the first Optical Temperature Verification has one or more of the following characteristics:
 (i) an event temperature of the at least one thermochromatic liquid crystal corresponds to the desired calibration temperature;
 (ii) at least two different thermochromatic liquid crystals are used, wherein at least one of said thermochromatic liquid crystals has a specific event temperature that differs from the event temperature of at least one other of said thermochromatic liquid crystals;
 (iii) at least three different thermochromatic liquid crystals are used, wherein a first thermochromatic liquid crystal has an event temperature that lies in a range of 45° C. to 55° C., the second thermochromatic liquid crystal has an event temperature that lies in a range of 70° C. to 80° C. and the third thermochromatic liquid crystal has an event temperature that lies in a range of 85° C. to 95° C.; and/or
 (iv) each different thermochromatic liquid crystal is used in a set comprising two or more of the same thermochromatic liquid crystal.

3. The method according to claim 1, having one or more of the following characteristics:
 (i) said method is used for verifying and/or calibrating a temperature measurement in a micro-environment;
 (ii) the temperature of the temperature-controlled environment comprising the micro-environments is recorded in the first Optical Temperature Verification and/or the second Optical Temperature Verification;
 (iii) the one or more different thermochromatic liquid crystals and the one or more of the different temperature dependent luminophores are provided in separate micro-environments;
 (iv) the temperature-dependent luminophore is a fluorescent dye;
 (v) the one or more temperature-dependent luminophores are provided in a micro-environment setting that corresponds with respect to characteristics that substantially influence temperature and/or optical characteristics of the micro-environment to reaction conditions that are carried out by the device in a respective micro-environment;
 (vi) the one or more temperature-dependent luminophores are provided in an aqueous solution;
 (vii) the one or more thermochromatic liquid crystal are removed prior to performing the second Optical Temperature Verification;
 (viii) the micro-environment is a reaction vessel; and/or
 (ix) the device is a thermal cycler.

4. The method according to claim 1, wherein the device is
 (i) a thermal cycler which comprises a metal block comprising receptacles for receiving reaction vessels or
 (ii) a thermal cycler which comprises a rotating element for receiving the reaction vessels that is located in a heated environment.

5. The method according to claim 1, wherein a) of the first Optical Temperature Verification has one or more of the following characteristics:
 (i) an event temperature of the at least one thermochromatic liquid crystal corresponds to the desired calibration temperature;
 (ii) at least three different thermochromatic liquid crystals are used, wherein at least one of said thermochromatic liquid crystals has a specific event temperature that differs from the event temperature of at least one other of said thermochromatic liquid crystals;
 (iii) at least three different thermochromatic liquid crystals are used, wherein a first thermochromatic liquid crystal has an event temperature that lies in a range of 45° C. to 55° C., the second thermochromatic liquid crystal has an event temperature that lies in a range of 70° C. to 80° C. and the third thermochromatic liquid crystal has an event temperature that lies in a range of 85° C. to 95° C.; and/or
 (iv) each different thermochromatic liquid crystal is used in a set comprising two or more of the same thermochromatic liquid crystal.

6. The method according to claim 1, wherein the one or more thermochromatic liquid crystals and the one or more temperature dependent luminophores are provided in different micro-environments.

7. The method according to claim 6, wherein the different micro-environments are different reaction vessels.

8. The method according to claim 1, wherein the thermochromatic liquid crystal is used in combination with a fluorophore in one micro-environment.

9. The method according to claim 8, wherein the one or more thermochromatic liquid crystal is placed at least partially before or behind a temperature dependent luminophore in relationship to an optical path of an optical system.

10. A system capable of being used in a method according to claim 1.

11. A method suitable for analysing temperature control of a device that is adapted to establish a defined temperature in a micro-environment, said method comprising a first Optical Temperature Verification that comprises
 a) providing one or more thermochromatic liquid crystals in the micro-environment, wherein each thermochromatic liquid crystal has a specific event temperature,
 b) providing one or more temperature dependent luminophores in the micro-environment,
 c) varying the temperature in the micro-environment and irradiating the micro-environment with light,
 d) recording the luminescence of the one or more temperature dependent luminophores when the event temperature of the one or more thermochromatic liquid crystals is reached in the micro-environment,
 wherein said method comprises a second Optical Temperature Verification, which comprises the following:
 a) providing one or more temperature dependent luminophores that were used in the First Optical Temperature Verification in a second micro-environment,
 b) varying the temperature of the second micro-environment and irradiating the second micro-environment with light,
 c) monitoring the luminescence emitted by the one or more temperature dependent luminophores.

12. The method according to claim 11, wherein in b) of the second Optical Temperature Verification a dynamic temperature profile is run which comprises several different temperature steps, and wherein at least one of said temperature steps differs from the event-temperature of at least one thermochromatic liquid crystal, wherein said temperature steps comprise one or more selected from the group consisting of a denaturation step, an annealing step, and an extension step.

13. A method suitable for analysing temperature control of a device that is adapted to establish a defined temperature in a micro-environment, said method comprising a first Optical Temperature Verification that comprises
   a) providing one or more thermochromatic liquid crystals in the micro-environment, wherein each thermochromatic liquid crystal has a specific event temperature,
   b) providing one or more temperature dependent luminophores in the micro-environment,
   c) varying the temperature in the micro-environment and irradiating the micro-environment with light,
   d) recording the luminescence of the one or more temperature dependent luminophores when the event temperature of the one or more thermochromatic liquid crystals is reached in the micro-environment,
   wherein in b) of the first Optical Temperature Verification a first temperature dependent luminophore and a second temperature dependent luminophore are provided which differ in temperature dependence.

14. The method according to claim 13, having one or more of the following characteristics:
   i. two different temperature dependent luminophores are used which substantially have the same optical characteristics;
   ii. two different temperature dependent luminophores are used in order to eliminate the drift of the detection system;
   iii. using a model for determining the fluorescence dependency of the temperature dependent luminophores and which is an empirical functional relation FI(T)=FI(Tref)·f(T/Tref) in case of the first temperature dependent luminophore and an Arrhenius equation $$FI(T) = FI(Tref) \cdot e^{c\left(\frac{1}{T} - \frac{1}{Tref}\right)}$$

in case of the second temperature dependent luminophore;
   where FI(T) is a fluorescence intensity at a temperature T given in Kelvin; FI(Tref) is a fluorescence intensity at a reference temperature Tref given in Kelvin; c=Enr/R, where Enr is the activation energy of the non-radiative process and R is the gas constant; and/or
   iv. Pyronin-Y and Atto 532 are used as the two different temperature-dependent luminophores.

15. The method according to claim 13, wherein the first temperature dependent luminophore has a higher temperature sensitivity than the second temperature dependent luminophore.

16. The method according to claim 15, wherein the quotient of fluorescence intensities determined at the same event temperature of the first temperature dependent luminophore divided by the second temperature dependent luminophore is formed.

17. A method suitable for analysing temperature control of a device that is adapted to establish a defined temperature in a micro-environment, said method comprising a first Optical Temperature Verification that comprises
   a) providing one or more thermochromatic liquid crystals in the micro-environment, wherein each thermochromatic liquid crystal has a specific event temperature,
   b) providing one or more temperature dependent luminophores in the micro-environment,
   c) varying the temperature in the micro-environment and irradiating the micro-environment with light,
   d) recording the luminescence of the one or more temperature dependent luminophores when the event temperature of the one or more thermochromatic liquid crystals is reached in the micro-environment,
   wherein in c) of the First Optical Temperature Verification, temperature is varied by using a temperature profile having a start point and an end point, wherein a step size for heating between the start point and the end point is set to be smaller than 1° C., and a hold-time for each step is set to be greater than 10 seconds.

18. The method according to claim 17, wherein the step size for heating between the start point and the end point is set to about 0.1° C. to 0.2° C., and wherein the hold-time is set to about 30 seconds.

19. A method suitable for analysing temperature control of a device that is adapted to establish a defined temperature in a micro-environment, said method comprising a first Optical Temperature Verification that comprises
   a) providing one or more thermochromatic liquid crystals in the micro-environment, wherein each thermochromatic liquid crystal has a specific event temperature,
   b) providing one or more temperature dependent luminophores in the micro-environment,
   c) varying the temperature in the micro-environment and irradiating the micro-environment with light,
   d) recording the luminescence of the one or more temperature dependent luminophores when the event temperature of the one or more thermochromatic liquid crystals is reached in the micro-environment,
   wherein influence of erroneous measurements of fluorescence intensity is reduced by averaging measurements of micro-environments comprising the same and/or neglecting measurements that exceed a threshold given in percent over each other measured fluorescence intensities.

20. A method for analysing temperature control of a device that is adapted to establish a defined temperature in a micro-environment, comprising using at least two different temperature dependent luminophores differing in temperature dependence for compensating optical drift of an optical system and determining a quotient of fluorescence intensities of the first temperature dependent luminophore and the second temperature dependent luminophore at the same temperature.

* * * * *